(12) United States Patent
Ehrlich et al.

(10) Patent No.: US 11,573,964 B2
(45) Date of Patent: Feb. 7, 2023

(54) REDUCING DATABASE SYSTEM QUERY TRANSACTION DELAY

(71) Applicant: AT&T Intellectual Property I, L.P., Atlanta, GA (US)

(72) Inventors: Willa Kay Ehrlich, Highland Park, NJ (US); Jo A. Frabetti, Bronx, NY (US); Yangyi Lu, Ann Arbor, MI (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 427 days.

(21) Appl. No.: 16/514,401

(22) Filed: Jul. 17, 2019

(65) Prior Publication Data
US 2021/0019321 A1 Jan. 21, 2021

(51) Int. Cl.
*G06F 16/2455* (2019.01)
*G06F 16/904* (2019.01)
*G06N 20/00* (2019.01)

(52) U.S. Cl.
CPC ...... *G06F 16/24553* (2019.01); *G06F 16/904* (2019.01); *G06N 20/00* (2019.01)

(58) Field of Classification Search
CPC .......... G06N 20/00; G06N 20/20; G06N 3/08; G06N 5/02; G06F 11/3409; G06F 16/212; G06F 16/217; G06F 16/24535; G06F 16/24542; G06F 16/24553; G06F 16/904
See application file for complete search history.

(56) References Cited

U.S. PATENT DOCUMENTS

| | | | | |
|---|---|---|---|---|
| 2015/0379429 A1* | 12/2015 | Lee | ......................... | G06N 20/00 706/11 |
| 2017/0257258 A1* | 9/2017 | Bingham | ............ | G06F 11/3006 707/737 |
| 2019/0102700 A1* | 4/2019 | Babu | ...................... | G06N 5/025 707/999.003 |
| 2020/0193313 A1* | 6/2020 | Ghanta | ............... | G06F 16/9038 707/737 |
| 2020/0356873 A1* | 11/2020 | Nawrocke | ......... | G06F 16/24561 707/737 |

(Continued)

OTHER PUBLICATIONS

Sharma, Ankur et al. "The Case for Automatic Database Administration using Deep Reinforcement Learning". Big Data Analytics Group, Saarland Informatics Campus; Jan. 18, 2018. https://arxiv.org/abs/1801.05643.

(Continued)

*Primary Examiner* — Yuk Ting Choi

(57) ABSTRACT

A processing system including at least one processor may obtain a first set of performance records of a database system, train a machine learning model in accordance with the first set of performance records, where the machine learning model that is trained in accordance with the first set of performance records is configured to predict a latency of a query transaction for a designated time period, present a user interface with a plurality of settings of the database system that are user-adjustable, where the plurality of settings is associated with at least a portion of the first set of performance records, calculate a first predicted latency of a query transaction at the designated time period via the machine learning model in accordance with a set of values of the plurality of settings, and present the first predicted latency via the user interface.

20 Claims, 8 Drawing Sheets

(56) References Cited

U.S. PATENT DOCUMENTS

2020/0410390 A1* 12/2020 Fu .................. G06F 11/3466
 707/737

OTHER PUBLICATIONS

Van Aken, Dana et al. "Automatic Database Management System Tuning Through Large-scale Machine Learning". SIGMOD' 17, May 14-19, 2017, Chicago, IL. http://dx.doi.org/10.1145/3035918.3064029.

* cited by examiner

PREDICTIVE ANALYSIS — DICTIONARY — MODEL SPECIFICATION

| VERTICA VARIABLE NAME | VERTICA VARIABLE DEFINITION |
|---|---|
| DAYID | Day of Week |
| HRID | Hour of Day |
| SESSID | 5-Minute Interval within Hour of Day |
| LIST_OF_POOLNMS | List of Resource Pools that Processed Transaction. Note that a transaction can be processed by more than one Resource Pool |
| TRNSID | Transaction Identifier |
| TRNSID_TOTAL_RESPONSE_TIME | Transaction Total Response (i.e., Residence) Time in secs. |
| TRNSID_NU_STMTS | Transaction Number of Statements |
| TRNSID_STMT_ARR_RTE | Transaction Rate of Statement Arrival in secs.: TRNSID_NU_STMTS/TRNSID_TOTAL_RESPONSE_TIME |
| TRNSID_AVERT_PER_STMT | Transaction Average Response Time (in secs.) per Statement: (1/TRNSID_NU_STMTS)*(sum of Transaction's Statements Response Times (in secs.)) |
| TRNSID_NU_CONCURR_STMTS | Transaction Number of Concurrent Statements: TRNSID_STMT_ARR_RTE*TRNSID_AVERT_PER_STMT |
| TRNSID_NU_NODES | Transaction Number of Unique (VERTICA Pool) Nodes Visited |
| TRNSID_NU_NODE_VISITS | Transaction Number of Node Visits to VERTICA Pool Nodes: sum of Transaction number of records in the LOGHSTVIEWS.resource_acquisitions table and Transaction number of records in the LOGHSTVIEWS.v_query_requests_hst table |
| TRNSID_AVE_NU_VISTS_PER_NODE | Transaction Average Number of Visits per (VERTICA Pool) Node: TRNSID_NU_NODE_VISITS/TRNSID_NU_NODES |
| TRNSID_AVERT_PER_NODE_VISIT | Transaction Average Response Time (in secs.) per Node Visit: (1/TRNSID_NU_NODE_VISITS)*(sum of Transaction Node Visits Response Times (in secs.)). Note that for Node Visits documented in the LOGHSTVIEWS.resource_acquisitions table, Node Visit Response Time is calculated by Release_Timestamp-Queue_Entry_Timestamp. For Node Visits documented in the LOGHSTVIEWS.v_query_requests_hst table, Node Visit Response Time is calculated by End_Timestamp-Start_Timestamp |
| TRNSID_NU_CONCURR_VISTS | Transaction Number of Concurrent Node Visits: (TRNSID_NU_NODE_VISITS/TRNSID_TOTAL_RESPONSE_TIME)*TRNSID_AVERT_PER_NODE_VISIT |
| TRNSID_AVE_ST_PER_RA_NODE_VISIT | Transaction Average Service Time (in secs.) per Node Visit: (1/TRNSID_RESOURCE_ACQUISITION_NODE_VISITS)*(sum of Transaction Node Visits Service Times (in secs.)). Note that measurements for this metric are available only from TRNSID records in the LOGHSTVIEWS.resource_acquisitions table and that a Transaction Node Visit Service Time is calculated by release_timestamp-acquisition_timestamp |
| ... | ... |

FIG. 3

| resource_quota_pool | node_name | transaction_id | statement_id | start_timestamp | release_timestamp |
|---|---|---|---|---|---|
| foo | v_pdw_node0061 | 3152519740181844674 | 1 | 5/23/2018 12:44:35.649806 | 5/23/2018 12:44:35.663598 |
| foo | v_pdw_node0061 | 3152519740181844674 | 2 | 5/23/2018 12:44:35.986369 | 5/23/2018 12:44:35.987250 |
| foo | v_pdw_node0061 | 3152519740181844674 | 3 | 5/23/2018 12:44:36.048677 | 5/23/2018 12:45:03.465585 |
| foo | v_pdw_node0061 | 3152519740181844674 | 4 | 5/23/2018 12:45:03.956572 | 5/23/2018 12:45:31.989734 |
| foo | v_pdw_node0061 | 3152519740181844674 | 4 | 5/23/2018 12:45:03.995621 | 5/23/2018 12:45:31.988290 |
| hoa | v_pdw_node0061 | 3152519740181844674 | 5 | 5/23/2018 12:45:32.076905 | 5/23/2018 12:50:43.625142 |
| hoa | v_pdw_node0058 | 3152519740181844674 | 5 | 5/23/2018 12:49:41.274810 | 5/23/2018 12:50:43.463240 |
| hoa | v_pdw_node0053 | 3152519740181844674 | 5 | 5/23/2018 12:49:41.276276 | 5/23/2018 12:50:43.465588 |
| hoa | v_pdw_node0040 | 3152519740181844674 | 5 | 5/23/2018 12:49:41.276550 | 5/23/2018 12:50:43.466662 |
| hoa | v_pdw_node0019 | 3152519740181844674 | 5 | 5/23/2018 12:49:41.276648 | 5/23/2018 12:50:43.462264 |
| hoa | v_pdw_node0007 | 3152519740181844674 | 5 | 5/23/2018 12:49:41.276819 | 5/23/2018 12:50:43.464517 |
| hoa | v_pdw_node0050 | 3152519740181844674 | 5 | 5/23/2018 12:49:41.276844 | 5/23/2018 12:50:43.465778 |
| hoa | v_pdw_node0063 | 3152519740181844674 | 5 | 5/23/2018 12:49:41.277151 | 5/23/2018 12:50:43.463113 |
| hoa | v_pdw_node0003 | 3152519740181844674 | 5 | 5/23/2018 12:49:41.277291 | 5/23/2018 12:50:43.471099 |
| hoa | v_pdw_node0027 | 3152519740181844674 | 5 | 5/23/2018 12:49:41.277333 | 5/23/2018 12:50:43.471068 |
| . | | | | | |
| . | | | | | |
| hoa | v_pdw_node0004 | 3152519740181844674 | 5 | 5/23/2018 12:49:43.370865 | 5/23/2018 12:50:43.476792 |
| hoa | v_pdw_node0041 | 3152519740181844674 | 5 | 5/23/2018 12:49:46.375119 | 5/23/2018 12:50:43.556665 |
| hoa | v_pdw_node0061 | 3152519740181844674 | 6 | 5/23/2018 12:50:43.701384 | 5/23/2018 12:51:56.948509 |
| hoa | v_pdw_node0061 | 3152519740181844674 | 7 | 5/23/2018 12:51:57.911447 | 5/23/2018 12:52:43.499321 |
| hoa | v_pdw_node0061 | 3152519740181844674 | 8 | 5/23/2018 12:52:43.814897 | 5/23/2018 12:54:26.634666 |
| hoa | v_pdw_node0061 | 3152519740181844674 | 9 | 5/23/2018 12:54:26.821075 | 5/23/2018 12:55:14.910479 |
| hoa | v_pdw_node0061 | 3152519740181844674 | 10 | 5/23/2018 12:55:16.368443 | 5/23/2018 12:56:22.548920 |
| hoa | v_pdw_node0061 | 3152519740181844674 | 11 | 5/23/2018 12:56:22.589489 | 5/23/2018 12:56:59.265687 |
| hoa | v_pdw_node0061 | 3152519740181844674 | 12 | 5/23/2018 12:56:59.288434 | 5/23/2018 12:58:28.752019 |
| hoa | v_pdw_node0061 | 3152519740181844674 | 13 | 5/23/2018 12:58:28.802029 | 5/23/2018 12:58:28.837823 |

REDUCING DATABASE SYSTEM QUERY TRANSACTION DELAY

The present disclosure relates generally to database systems, and more particularly to methods, computer-readable media, and devices for calculating and presenting predicted latencies of transaction queries and to methods, computer-readable media, and devices for selecting and presenting configuration settings for at least one resource quota pool.

BACKGROUND

Achieving low transaction latency in a Database Management System (DBMS) is a challenging task. Many interacting factors may affect transaction response time, such as the existence of resource hard/soft bottlenecks, a wait on a mutual exclusion (mutex) lock, an insufficient number of threads, node storage sub-systems or network bandwidth issues, insufficient server resource capacity, and so forth. As databases grow in both size (databases may contain more data and more concurrent end-users and applications) and complexity (queries may require more complicated joins and utilize more indices; new data may be loaded into tables coincident with queries to existing table data), reducing latency in the DBMS may be an even greater challenge.

SUMMARY

In one example, the present disclosure describes a method, computer readable medium, and device for calculating and presenting predicted latencies of transaction queries. For instance, in one example, a processing system including at least one processor may obtain a first set of performance records of a database system, train a machine learning model in accordance with the first set of performance records, where the machine learning model that is trained in accordance with the first set of performance records is configured to predict a latency, present a user interface with a plurality of settings of the database system that are user-adjustable, where the plurality of settings is associated with at least a portion of the first set of performance records, calculate a first predicted latency of a query transaction at the designated time period via the machine learning model in accordance with a set of values of the plurality of settings, and present the first predicted latency via the user interface.

In another example, the present disclosure describes a method, computer readable medium, and device for selecting and presenting configuration settings for at least one resource quota pool. For instance, a processing system including at least one processor may obtain a first set of performance records of a database system, train a machine learning model in accordance with the first set of performance records, where the machine learning model that is trained in accordance with the first set of performance records is configured to predict a query sub-operation delay at a server node of the database system for at least one resource quota pool for a designated time period, obtain, via a user interface, at least one input selecting the designated time period, select a set of values of a plurality of configuration settings for at least one resource quota pool for the designated time period at the server node in accordance with the machine learning model, and present the set of values of the plurality of configuration settings via the user interface.

BRIEF DESCRIPTION OF THE DRAWINGS

The present disclosure can be readily understood by considering the following detailed description in conjunction with the accompanying drawings, in which:

FIG. 3 illustrates an example dictionary presented via a user interface, in accordance with the present disclosure;

FIG. 4 illustrates an example record table comprising records for query sub-operations in connection with a query transaction;

To facilitate understanding, identical reference numerals have been used, where possible, to designate identical elements that are common to the figures.

DETAILED DESCRIPTION

Figure 1:
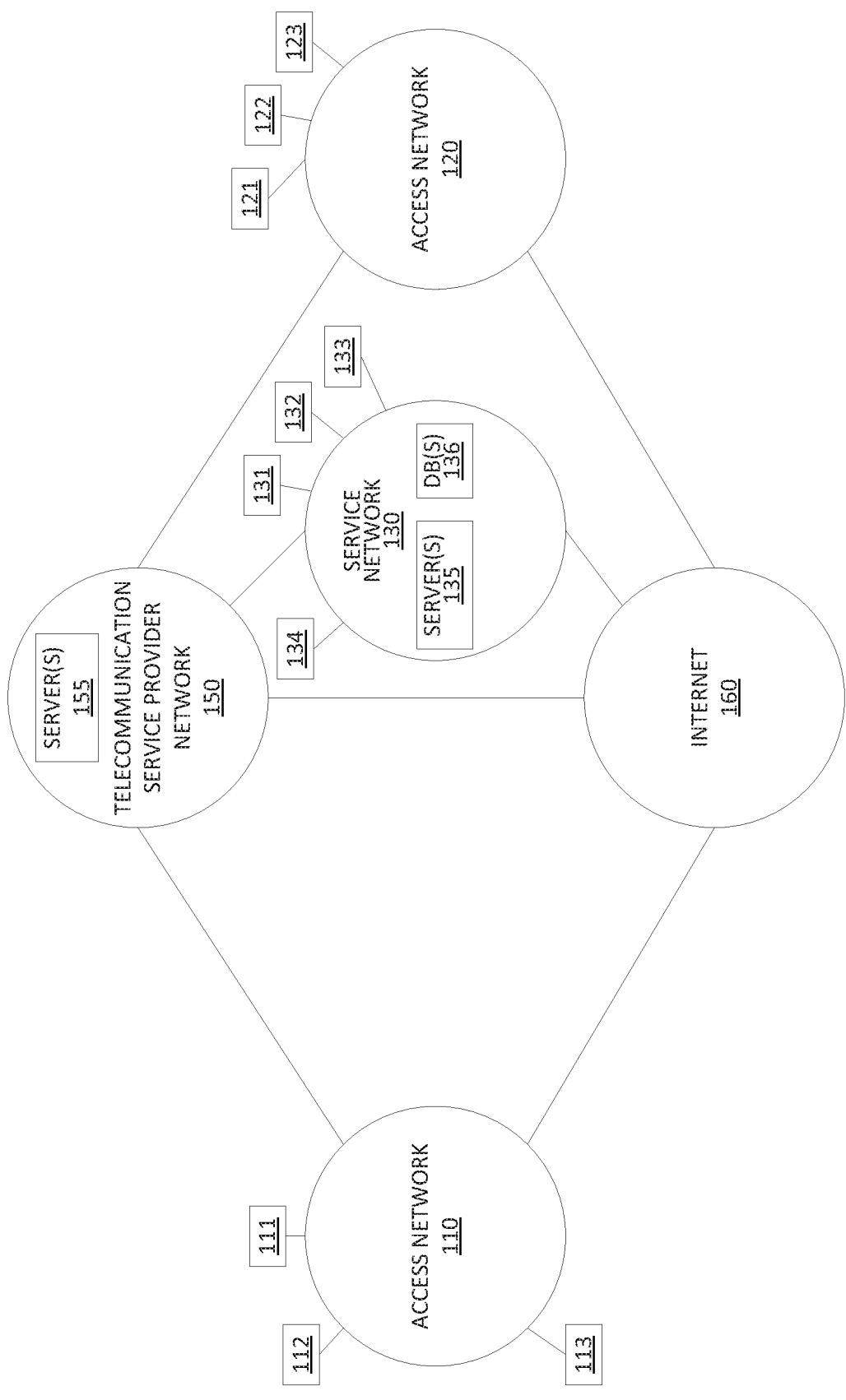
FIG. 1 illustrates one example of a system related to the present disclosure.

The present disclosure broadly discloses methods, non-transitory (i.e., tangible or physical) computer-readable storage media, and devices for calculating and presenting predicted latencies of transaction queries, and methods, non-transitory (i.e., tangible or physical) computer-readable storage media, and devices for selecting and presenting configuration settings for at least one resource quota pool. In one example, machine learning (ML) models (MLMs) are trained to predict transaction latency from DBMS performance metrics measured over different hours and over weeks, under different combinations of settings, and load and resource consumption values. In one example, a LASSO (Least Absolute Shrinkage and Selection Operator) ML model is used. For instance, LASSO applies a regularized version of least squares for eliminating irrelevant variables in linear regression models. By adding a penalty to the loss function, LASSO effectively shrinks some weights and forces others to zero and automatically selects more relevant features (e.g., those with non-zero weights) while discarding the others (e.g., those with zero weights). Furthermore, it is observed that LASSO regression appears to deal effectively with correlated predictors (or independent variables) by tending to select one covariate and ignoring the remainder, thus pruning redundant independent variables.

In one example, a trained MLM is embedded in a user application, e.g., for database administrators (DBAs), performance engineers, or the like, to assist in establishing initial settings. In one example, the present disclosure focuses on optimizing tunable settings that may vary as a function of load and resource usage. In one example, these settings can be modified in near real time automatically if current hour of week load and resource consumption values differ significantly from expected values. In this case, the MLM may be retrained with the current weeks' hourly measurements, new MLM values (e.g., coefficients) may be established, and optimal tunable settings for that hour of the week may be recalculated and subsequently implemented.

Various parameters, including configuration settings, may affect DBMS transaction latency, such as buffer size, maximum memory allocation, number of indexes for a database table, and so on. Examples of the present disclosure identify and optimize tunable settings of the DBMS that are most critical for latency for different hours of the week. In addition, in one example, the present disclosure identifies critical predictor variables (DBMS parameters) that are not easily manipulated (e.g., some DBMS design-related parameters may be fixed and may not be alterable by a user, such as the number of sub-queries within an initiated query request, others reflect load and resource consumption values which may be subject to overall user demand). These non-manipulable variables may be set to certain (e.g., average or median) values applicable to a given hour of the week, while users may be enabled to adjust settings associated with variables that can actually be manipulated (broadly, "tunable settings") in order to obtain a predicted latency in accordance with a trained MLM.

In one example, the present disclosure detects hourly DBMS workload changes, and computes deviations from expected values (e.g., deviation from average or median values). In addition, a dynamic thresholding is applied to detect statistically significant changes to expected workload (e.g., for a given hour). When a threshold deviation is detected, the MLM may be retrained against more recent performance data and new MLM parameter values (e.g., coefficients) may be implemented.

In a first example, the present disclosure applies a MLM (e.g., a LASSO MLM) to predict the effect of different predictor variable settings on query transaction latency, or end-to-end response time. Notably, a single user-initiated query transaction can generate multiple statements or query sub-operations. Thus, multiple factors can affect query transaction total end-to-end response time/latency, such as: transaction characteristics (e.g., number of statements, degree to which a sub-operation can execute concurrently on a set of server nodes versus executing serially on a single server node, average response time per statement, etc.), transaction resource usage (e.g. transaction average memory used per server node visit), DBMS workload characteristics (e.g., transaction arrival rate by resource quota pool, for instance, a transaction environment that specifies quotas on an amount of resources that a query transaction sub-operation can utilize on a given server node), DBMS overall load (e.g., transaction arrival rate), DBMS overall resource usage (such as a memory usage and/or a memory usage per server node), and so on. The end-to-end response time is the time that it takes for all of the query transaction's sub-operations to complete.

In one example, the present disclosure provides a user application comprising a user interface, such as a graphical user interface (GUI), that enables a user (e.g., a database administrator) to select an hour of the week, and for the given hour of the week, the application may retrieve a set of performance records representative of the specified time period and then compute and display median values for the predictor variables (independent variables). In one example, the user interface provides adjustment options, such as slider bars, numerical/text input fields, drop down menus, wheels, or the like for the top N predictor variables corresponding to tunable settings. In other words, the N predictor variables corresponding to tunable settings with the highest model absolute weights are displayed with adjustment options. In one example, the adjustment options may be set to average, or median values. The user can then manipulate the values (e.g., using sliders via the user interface), and the application may then return the predicted end-to-end query transaction response time for that hour of the week and for the particular combination of (tunable) settings and other parameters (e.g., non-configurable performance variables, which may be assumed to be average, or median values). The predicted end-to-end response time, or latency, that is presented may be calculated in accordance with the trained MLM, such as a trained LASSO MLM.

Figure 2:
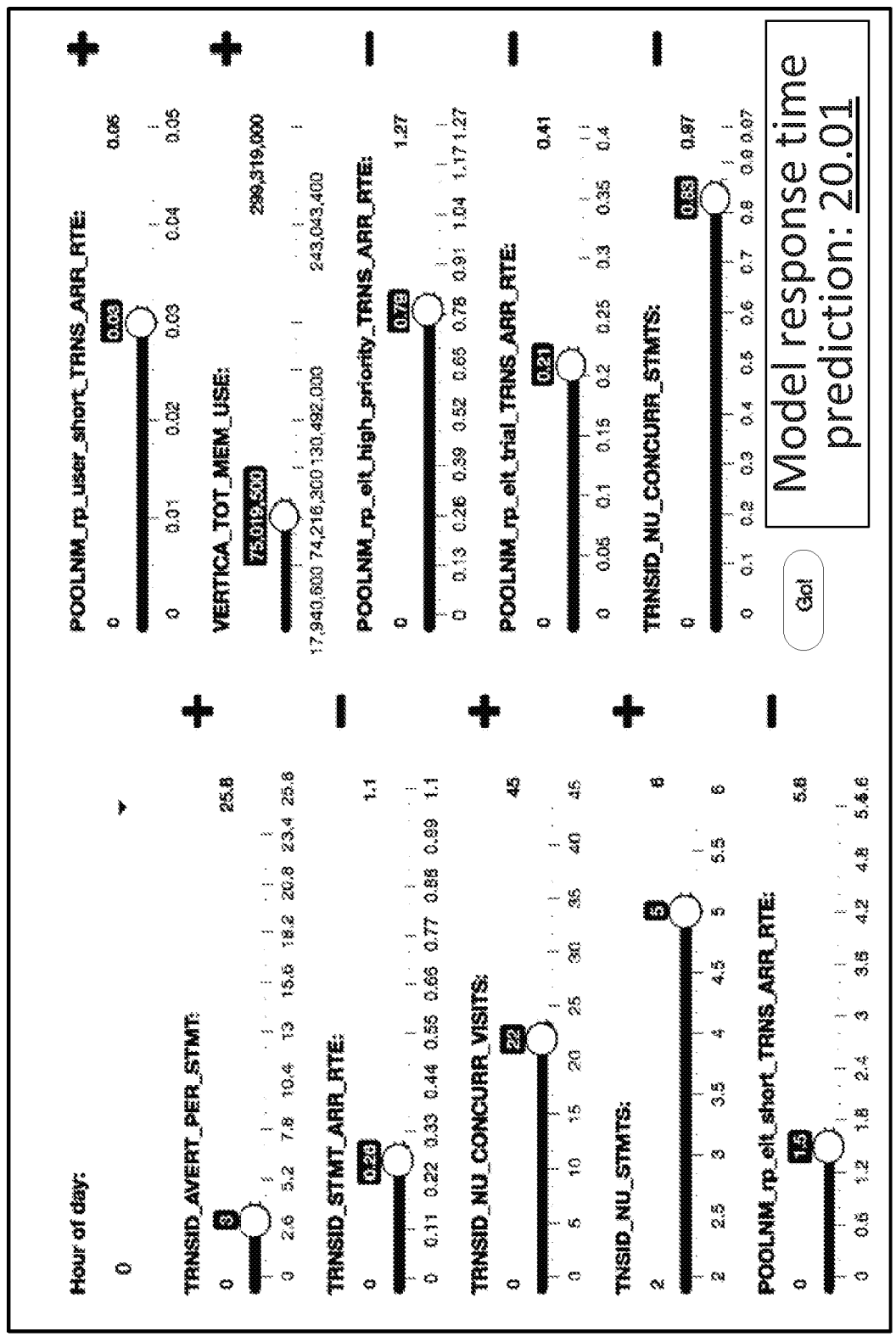
FIG. 2 illustrates an example user interface in accordance with an example of the present disclosure for calculating and presenting predicted latencies of query transactions.

In one example, a LASSO MLM is used. This is a linear regression model ($Y=X\beta+\varepsilon$) based on a least absolute shrinkage and selection operator function (LASSO) loss function. This model provided the smallest training and test error among models tested. An example user interface is shown in FIG. 2. In the example of FIG. 2, ten numeric predictor variables are presented. These specific predictor variables were selected based on the magnitudes of the (absolute) values, their respective weights as well as on their interpretability.

In one example, the MLM is trained from performance records each containing performance information about a query transaction during a specified time interval. To illustrate, in one example, the time period (e.g., hour of the week) may comprise a factor variable and various performance variables (or "performance metrics") may be include as numeric variables. The MLM may therefore be trained via LASSO regression from the performance records to obtain estimated coefficients for all predictor variables. After the training phase, the MLM may be applied to predict query transaction end-to-end response time. For example, a processing system of the present disclosure may: a) initially examine the absolute value of weights associated the performance predictor variables and select the top N performance predictor variables with the highest absolute weights for display and possible user manipulation (i.e., "manipulated" predictor variables); b) retrieve performance records relating to query transactions for the designated time period (e.g., the specified hour of the week); c) set the time period in the MLM to the specified time period; d) calculate "typical" (e.g., median) values for the MLM's residual numeric performance variables; and e) apply the MLM. The processing system may then return the calculated query transaction response time. The MLM can then be rerun under different user-applied settings of "manipulated" predictor variables.

In another example, the present disclosure provides a tool to minimize query sub-operation delay by optimizing resource quota pool configuration settings, e.g., for a given hour of the week. For instance, a feature of many DBMS architectures is that query sub-operations execute within a resource quota pool configured as a resource budget (e.g., resource quota pool X is configured to acquire a maximum amount of Y units of memory from a general resource pool). In the present example, another machine learning model (e.g., another LASSO MLM) is constructed to predict the effect of resource quota pool configuration settings on sub-operation delay at a server node based on performance data collected for multiple resource quota pools over multiple weeks.

In one example, different resource quota pools may be associated with different classes of query sub-operations. As just one example, a query sub-operation may be categorized as one of three types: short, medium, and large. For instance, sub-queries may be placed into one of three categories based upon sub-operation service time (e.g., in seconds) and memory used (e.g., in kilobytes (KB)). Large queries consume more memory and are more complex (e.g., require greater service at a server node) than medium queries, which consume more typical (most average) amounts of memory and service time, while short queries require only small amounts of both memory and service time. Thus, a database administrator may decide to assign scheduled sub-queries into three separate resource quota pools so as to prevent longer running, more memory intensives sub-queries from blocking smaller, less memory intensive sub-queries. In this case, different configuration settings for these resource quota pools for each class of query sub-operations may be set for a given hour of the week so as to obtain the lowest latency for each class.

In one example, a user application is provided comprising a user interface, such as a GUI, that enables a user (e.g., a database administrator) to select an hour of the week and a resource quota pool, and for the given hour of the week and the resource quota pool, the application may retrieve a set of "matching" performance data records. The application may then calculate "typical" (e.g., median) values for the specified resource quota pool's performance variables for the hour of the week, and apply the MLM (e.g., the coefficients, or MLM weights) to the calculated values of the performance variables to determine the best or optimal configuration settings for the resource quota pool, e.g., the configuration settings that minimize the resource quota pool's sub-operation delay during the selected time period. The application may then return the specified resource quota pool's predicted sub-operation response time (for the specified hour of the week) and the resource quota pool's recommended, or "optimal" configuration settings.

In one example, these configuration settings can be modified automatically in near real time if current hour of week load and resource consumption values differ significantly from expected values (where significance may be quantified in any number of ways, such as a Euclidean distance calculated in a feature space representing the values of multiple performance parameters in combination with a Holt-Winters adaptive thresholding). In this case, the MLM may be re-run to account for the current week's data, e.g., calculating new median values, determining new coefficients for the MLM, and recalculating new optimal tunable configuration settings for that hour of the week. In one example, the new optimal tunable configuration settings may be presented via the user interface. Alternatively, or in addition, the tunable configuration settings calculated in accordance with the present MLM may be automatically applied to one or more server nodes. Accordingly, the new optimal tunable configuration settings may be forwarded to such server node(s) for implementation after the recalculation.

In one example, the MLM is trained from performance records each containing performance information and resource quota pools' configuration parameter values about a sub-operation executing within a given resource quota pool during a specified time interval. To illustrate, there may be $i=1, 2, \ldots, I$ resource quota pools. Each resource quota pool may have $j=1, 2, \ldots J$ configuration settings. Each resource quota pool configuration settings takes on $n=1, 2, \ldots, N_{IJ}$ values where $X_{ijn}$ represents the $n^{th}$ value observed for the $j^{th}$ configuration setting in the $i^{th}$ resource quota pool. Accordingly, I×J resource quota pool settings will appear within each performance record. Some of the resource quota pools' configuration settings may refer to the specific pool that the sub-operation is executing within (e.g., sub-operation is executing within the $I^{th}$ resource quota pool so that the J resource quota pool configuration settings for the resource quota pool that the sub-operation is executing in are: $k=((I-1)*J)+1, ((I-1)*J)+2, \ldots, I*J)$ while other resource quota pools' configuration settings refer to settings of other resource quota pools' configuration parameters (i.e., resource quota pool configuration settings for resource quota pools $i=1, 2, \ldots, I-1$: $k=1, 2, \ldots, ((I-1)*J)$).

For training the MLM, the time period (e.g., hour of the week), resource quota pool identifier, and resource quota pools' configuration settings may comprise factor variables, and various performance variables (or "performance metrics") may be include as numeric variables. The MLM may therefore be trained via LASSO regression from the performance records to obtain estimated coefficients for all predictor variables. After the training phase, the MLM may be applied to predict "optimal" configuration settings for at least one resource quota pool. For example, a processing system of the present disclosure may: a) retrieve performance records relating to sub-operations executing within the specified resource quota pool for a specified time period (e.g., an hour of the week); b) set the time period in the MLM to the specified time period; c) set resource quota pool identifier in the MLM to the specified resource quota pool identifier; d) calculate "typical" (e.g., median) values for the MLM's numeric performance variables; and e) select optimal values for resource quota pools' configuration settings.

In one example, the selection of the optimal values for the resource quota pools' configuration settings may proceed as follows: for each configuration setting with n levels, (A) encode as a vector of length n−1; (B) check n−1 coefficients, (i) if all n−1 coefficients are non-zero and positive, then choose level not encoded in vector of length n−1, (ii) if less than n−1 coefficients are non-zero and all are positive, then choose randomly among set of levels ((a) level is not encoded in vector of length n−1 or (b) level has 0 coefficient), (iii) if there exist n−1 or less coefficients that are negative, then select level with negative coefficient that has the highest absolute value (i.e., smallest value).

In one example, the MLM predictor variables' weights are also used to compute the minimal sub-operation delay when a sub-operation is executing within the specified resource quota pool during the specified time period. The processing system may then return the calculated sub-operation response time and the resource quota pools' optimal configuration settings (the predicted optimal values for the configuration settings).

In one example, the present disclosure may include a variation of the above to construct a MLM that may calculate query sub-operation delay and that may provide optimal values for configuration settings with respect to an average query sub-operation executing within any resource quota pool. In other words, the present example may comprise a generalization across all or a plurality of resource quota pools. Similar to the above, the MLM may be trained from performance records each containing performance information and resource quota pools' configuration setting values about a sub-operation executing within a given resource quota pool during a specified time interval. However, the time period (e.g., hour of the week) and resource quota pools' configuration settings may comprise factor variables, and various performance variables (or "performance metrics") may be include as numeric variables. It should be noted that the resource quota pool identifier is excluded from the independent variables of the MLM. Although such information may be available in the performance records, it is not used in the present example.

The MLM may therefore be trained via LASSO regression from the performance records to obtain estimated coefficients for all predictor variables. After the training phase, the MLM may be applied to predict "optimal"

configuration settings for at least one resource quota pool. For example, a processing system of the present disclosure may: (a) retrieve performance records relating to sub-operations executing within the specified time period (e.g., hour of the week) (the performance records may not necessarily relate to a specific resource quota pool, such as in the example above); b) set the time period in the MLM to the specified time period; c) calculate "typical" (e.g., median) values for the MLM's numeric performance variables; and d) select optimal values for resource quota pools' configuration settings. The selecting of the resource quota pools' optimal configuration settings may be as described above. The processing system may then use the MLM predictor variables' weights to compute the minimal sub-operation delay when a sub-operation is executing within a resource quota pool during the specified time period. The processing system may also return the calculated sub-operation response time and the resource quota pools' predicted optimal configuration settings.

In yet another example, a variation of the above may involve construction of a MLM to assist in selecting optimal configuration settings for a specific query sub-operation type. In addition, in one example, a new resource quota pool may be created for the specific query sub-operation type in order to implement the predicted optimal configuration settings for the specific query sub-operation type. Similar to the above, the MLM may be trained from performance records each containing performance information and resource quota pools' configuration setting values about a sub-operation executing within a given resource quota pool during a specified time interval. However, the time period (e.g., hour of the week) and resource quota pool's configuration settings may comprise factor variables, and various performance variables (or "performance metrics") may be include as numeric variables. It should be noted that the resource quota pool identifier is excluded from the independent variables of the MLM. In addition, the factor variables include the configuration settings for the resource quota pool in which a query sub-operation executes, but does not include the configuration settings for other resource quota pools (unlike the two other examples above). Although such information may be available in the performance records, it is not used in the present example.

The MLM may therefore be trained via LASSO regression from the performance records to obtain estimated coefficients for all predictor variables. After the training phase, the MLM may be applied to predict "optimal" configuration settings for a particular query sub-operation type (where queries of such query sub-operation type may execute within at least one resource quota pool). For example, a processing system of the present disclosure may: a) retrieve performance records relating to sub-operations executing for the specified time period (e.g., hour of the week); b) set the time period in the MLM to the specified time period; c) set memory used and service time in the MLM to values associated with the specified query sub-operation type; d) calculate "typical" (e.g., median) values for the MLM's "other" numeric performance variables; and e) select optimal values for the configuration settings for the query sub-operation type (where sub-operations of the particular sub-operation type may execute within at least one resource quota pool, and where the configuration setting values may be applied to the at least one resource quota pool). The selecting of the optimal values for the configuration settings may be as described above.

The processing system may then use the MLM predictor variables' weights to compute the minimal sub-operation delay when a sub-operation of the sub-operation type is executing during the specified time period. The processing system may also returns the calculated sub-operation response time and the optimal configuration settings. In one example, the configuration setting values may be applied to a new resource quota pool that may be created for the query sub-operation type (e.g., corresponding to the J resource quota pool configuration settings for the "new" resource quota pool configuration settings).

With respect to all of the foregoing examples, the present disclosure may include a KPI (key performance indicator) generation engine process. This process can be initiated on demand or can be executed periodically to retrieve DBMS raw performance counters from a data depository over some specified time interval for some specified number of sampling intervals (e.g., 5-minute sampling intervals). Alternatively, or in addition, the process can be executed as a background process to intercept real-time DBMS raw performance data from one or more sources (e.g., server nodes). For both modes, a subset of the raw performance counters may be stored in a semi-persistent data store for subsequent time series analysis. Following data ingest, the process may compute a set of DBMS KPIs, store these KPIs within a data store, and then apply these KPIs to generate a set of machine learning records, which may be stored with the same or a different data store. The records may be used to train one or more MLMs as described herein.

In one example, one or more MLMs as described herein may be generated via a cloud analytics MLM engine. An example MLM engine is the RCloud environment (e.g., a RESTful web services notebook environment) containing a set of machine learning libraries. In an RCloud implementation, a MLM engine can reference machine learning records that are being stored either locally or remotely. The output of the MLM engine is a predictive MLM object.

As described above, examples of the present disclosure may provide a user application, e.g., a GUI, to provide options for predicting end-to-end response time in accordance with tunable settings for a given time period (e.g., hour of the week), and/or for providing recommended tunable configuration settings for a at least one resource quota pool executing on a server node. In one example, the user application may comprise a GUI web application, which may be built using open-source libraries and platforms such as RCloud, Rserve, Shiny, Websocket, FastR-Web, RJDB, canvasXpress and glmnet, for back-end, middle layer, and front-end user interface (UI) layers. KPI data and/or machine learning records (stored locally or remotely) may be referenced and then manipulated into relevant objects to create UI selection parameter values used by UI widgets such as sliders and dropdowns. In one example, UI input data (e.g., tunable settings selected by a user via the UI and a selected time period), together with the KPI/machine learning record data may then be input into a MLM to generate predicted DBMS query transaction end-to-end response time for the given time period. The predicted value from the MLM may then display in the GUI application, e.g., using Hypertext Transfer Protocol (HTTP), Java Script Object Notation (JSON) and other web technologies to display a web page. In another example, UI input data (e.g., a selection of time period, and in various examples a given resource quota pool or a particular query sub-operation type) together with the KPI/machine learning record data may be input into a MLM to generate recommended tunable configuration parameters to minimize a sub-query latency for at least one resource quota pool for the given time period.

With respect to all of the foregoing examples, an adaptive thresholding process may be applied that executes in the background to intercept real-time DBMS raw performance data from a source. The process may compute a distance metric on current observed performance data versus expected performance data for the time period (e.g., retrieved from a semi-persistent data store), such as DBMS load or resource performance variables. The process may then apply a threshold discriminator, e.g., a Holt-Winters adaptive thresholding, to determine whether the distance metric is statistically higher than expected for the current time interval. If the computed deviation score is statistically significant, then the process may reinitialize, or retrain a MLM as describe herein.

The present disclosure may also include a component process for implementing DBMS tunable configuration settings. For instance, as described above tunable configuration settings calculated in accordance with the present MLM may be automatically applied to one or more server nodes. In this case, the process may handle communication to various server nodes to implement various tunable configuration settings with respect to different resource quota pools and for respective time periods, e.g., different hourly settings per resource quota pool and per server node. These and other aspects of the present disclosure are discussed in greater detail below in connection with the examples of FIGS. 1-8.

To aid in understanding the present disclosure, FIG. 1 illustrates an example system 100 comprising a plurality of different networks in which examples of the present disclosure for calculating and presenting predicted latencies of transaction queries and/or for selecting and presenting configuration settings for at least one resource quota pool may operate. Telecommunication service provider network 150 may comprise a core network with components for telephone services, Internet services, and/or television services (e.g., triple-play services, etc.) that are provided to customers (broadly "subscribers"), and to peer networks. In one example, telecommunication service provider network 150 may combine core network components of a cellular network with components of a triple-play service network. For example, telecommunication service provider network 150 may functionally comprise a fixed mobile convergence (FMC) network, e.g., an IP Multimedia Subsystem (IMS) network. In addition, telecommunication service provider network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication service provider network 150 may also further comprise a broadcast television network, e.g., a traditional cable provider network or an Internet Protocol Television (IPTV) network, as well as an Internet Service Provider (ISP) network. With respect to television service provider functions, telecommunication service provider network 150 may include one or more television servers for the delivery of television content, e.g., a broadcast server, a cable head-end, a video-on-demand (VoD) server, and so forth. For example, telecommunication service provider network 150 may comprise a video super hub office, a video hub office and/or a service office/central office.

In one example, telecommunication service provider network 150 may also include one or more servers 155. In one example, the servers 155 may each comprise a computing system, such as computing system 800 depicted in FIG. 8, and may be configured to host one or more centralized system components in accordance with the present disclosure. For example, a first centralized system component may comprise a database of assigned telephone numbers, a second centralized system component may comprise a database of basic customer account information for all or a portion of the customers/subscribers of the telecommunication service provider network 150, a third centralized system component may comprise a cellular network service home location register (HLR), e.g., with current serving base station information of various subscribers, and so forth. Other centralized system components may include a Simple Network Management Protocol (SNMP) trap, or the like, a billing system, a customer relationship management (CRM) system, a trouble ticket system, an inventory system (IS), an ordering system, an enterprise reporting system (ERS), an account object (AO) database system, and so forth. In addition, other centralized system components may include, for example, a layer 3 router, a short message service (SMS) server, a voicemail server, a video-on-demand server, a server for network traffic analysis, and so forth. It should be noted that in one example, a centralized system component may be hosted on a single server, while in another example, a centralized system component may be hosted on multiple servers, e.g., in a distributed manner. For ease of illustration, various components of telecommunication service provider network 150 are omitted from FIG. 1.

In one example, access networks 110 and 120 may each comprise a Digital Subscriber Line (DSL) network, a broadband cable access network, a Local Area Network (LAN), a cellular or wireless access network, and the like. For example, access networks 110 and 120 may transmit and receive communications between endpoint devices 111-113, endpoint devices 121-123, and service network 130, and between telecommunication service provider network 150 and endpoint devices 111-113 and 121-123 relating to voice telephone calls, communications with web servers via the Internet 160, and so forth. Access networks 110 and 120 may also transmit and receive communications between endpoint devices 111-113, 121-123 and other networks and devices via Internet 160. For example, one or both of the access networks 110 and 120 may comprise an ISP network, such that endpoint devices 111-113 and/or 121-123 may communicate over the Internet 160, without involvement of the telecommunication service provider network 150. Endpoint devices 111-113 and 121-123 may each comprise a telephone, e.g., for analog or digital telephony, a mobile device, such as a cellular smart phone, a laptop, a tablet computer, etc., a router, a gateway, a desktop computer, a plurality or cluster of such devices, a television (TV), e.g., a "smart" TV, a set-top box (STB), and the like. In one example, any one or more of endpoint devices 111-113 and 121-123 may represent one or more user devices and/or one or more servers of one or more data set owners, such as a weather data service, a traffic management service (such as a state or local transportation authority, a toll collection service, etc.), a payment processing service (e.g., a credit card company, a retailer, etc.), a police, fire, or emergency medical service, and so on. For instance, any of endpoint devices 111-113 and 121-123 may comprise a device that is used by a database administrator of any of such entities.

In one example, the access networks 110 and 120 may be different types of access networks. In another example, the access networks 110 and 120 may be the same type of access network. In one example, one or more of the access networks 110 and 120 may be operated by the same or a different service provider from a service provider operating the telecommunication service provider network 150. For example, each of the access networks 110 and 120 may comprise an Internet service provider (ISP) network, a cable access network, and so forth. In another example, each of the access networks 110 and 120 may comprise a cellular access network, implementing such technologies as: global system for mobile communication (GSM), e.g., a base station subsystem (BSS), GSM enhanced data rates for global evolution (EDGE) radio access network (GERAN), or a UMTS terrestrial radio access network (UTRAN) network, among others, where telecommunication service provider network 150 may provide mobile core network functions, e.g., of a public land mobile network (PLMN)-universal mobile telecommunications system (UMTS)/General Packet Radio Service (GPRS) core network, or the like. In still another example, access networks 110 and 120 may each comprise a home network or enterprise network, which may include a gateway to receive data associated with different types of media, e.g., television, phone, and Internet, and to separate these communications for the appropriate devices. For example, data communications, e.g., Internet Protocol (IP) based communications may be sent to and received from a router in one of the access networks 110 or 120, which receives data from and sends data to the endpoint devices 111-113 and 121-123, respectively.

In this regard, it should be noted that in some examples, endpoint devices 111-113 and 121-123 may connect to access networks 110 and 120 via one or more intermediate devices, such as a home gateway and router, or an enterprise gateway and router, e.g., where access networks 110 and 120 comprise cellular access networks, ISPs and the like, while in another example, endpoint devices 111-113 and 121-123 may connect directly to access networks 110 and 120, e.g., where access networks 110 and 120 may comprise local area networks (LANs), enterprise networks, and/or home networks, and the like.

In one example, the service network 130 may comprise a local area network (LAN), or a distributed network connected through permanent virtual circuits (PVCs), virtual private networks (VPNs), and the like for providing data and voice communications. In one example, the service network 130 may be associated with the telecommunication service provider network 150. For example, the service network 130 may comprise one or more devices for providing services to subscribers, customers, and/or users. For example, telecommunication service provider network 150 may provide a cloud storage service, web server hosting, and other services. As such, service network 130 may represent aspects of telecommunication service provider network 150 where infrastructure for supporting such services may be deployed. In another example, service network 130 may represent a third-party network, e.g., a network of an entity that provides a service for calculating and presenting predicted latencies of transaction queries and/or for selecting and presenting configuration settings for at least one resource quota pool, in accordance with the present disclosure.

In the example of FIG. 1, service network 130 may include one or more servers 135 which may each comprise all or a portion of a computing device or system, such as computing system 800, and/or processing system 802 as described in connection with FIG. 8 below, specifically configured to perform various steps, functions, and/or operations for calculating and presenting predicted latencies of transaction queries and/or for selecting and presenting configuration settings for at least one resource quota pool, as described herein. For example, one of server(s) 135, or a plurality of servers 135 collectively, may perform operations in connection with the example method 600 and/or the example method 700, or as otherwise described herein. In one example, one or more of the servers 135 may be configured to comprise or provide a KPI (key performance indicator) generation engine process, a cloud analytics MLM engine, a server-side component for a user application, an adaptive thresholding process, a process for implementing DBMS tunable configuration settings, and so forth. In one example, one or more of the servers 135 may comprise all or at least a portion of a DBMS.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 8 and discussed below) or multiple computing devices collectively configured to perform various steps, functions, and/or operations in accordance with the present disclosure.

In one example, service network 130 may also include one or more databases (DBs) 136, e.g., physical storage devices integrated with server(s) 135 (e.g., database servers), attached or coupled to the server(s) 135, and/or in remote communication with server(s) 135 to store various types of information in support of systems for calculating and presenting predicted latencies of transaction queries and/or for selecting and presenting configuration settings for at least one resource quota pool, as described herein. As just one example, DB(s) 136 may be configured to receive and store network operational data collected from the telecommunication service provider network 150, such as call logs, mobile device location data, control plane signaling and/or session management messages, data traffic volume records, call detail records (CDRs), error reports, network impairment records, performance logs, alarm data, and other information and statistics, which may then be compiled and processed, e.g., normalized, transformed, tagged, etc., and forwarded to DB(s) 136, via one or more of the servers 135.

Similarly, DB(s) 136 may receive and store weather data from a device of a third-party, e.g., a weather service, a traffic management service, etc. via one of access networks 110 or 120. For instance, one of the endpoint devices 111-113 or 121-123 may represent a weather data server (WDS). In one example, the weather data may be received via a weather service data feed, e.g., an NWS extensible markup language (XML) data feed, or the like. In another example, the weather data may be obtained by retrieving the weather data from the WDS. In one example, DB(s) 136 may receive and store weather data from multiple third-parties. Similarly, one of endpoint devices 111-113 or 121-123 may represent a server of a traffic management service and may forward various traffic related data to DB(s) 136, such as toll payment data, records of traffic volume estimates, traffic signal timing information, and so forth. In one example, server(s) 135 and/or DB(s) 136 may comprise cloud-based and/or distributed data storage and/or processing systems comprising one or more servers at a same location or at different locations. For instance, DB(s) 136, or DB(s) 136 in conjunction with one or more of the servers 135, may represent a distributed file system, e.g., a Hadoop® Distributed File System (HDFS™), or the like.

In accordance with the present disclosure, DB(s) 136 may also be configured to generate and store various KPIs with regard to the performance of DB(s) 136. For instance, DB(s) 136 may represent all or a portion of a database system, and may generate and record KPIs regarding system performance. Alternatively, or in addition, one or more of servers 135 may comprise a database management system (DBMS) and may obtain raw performance data of one or more of the DB(s) 136. The one or more of servers 135 comprising a DBMS may then generate KPIs of the DB(s) 136 from the raw performance data, and may then store these KPIs in one or more of the DB(s) 136. In addition, one or more of servers 135 comprising a DBMS may also process the KPIs to generate one or more sets of machine learning records, which may also be stored at one or more of the DB(s) 136. The records may be used to train one or more MLMs (e.g., by one or more of the servers 135) as described herein.

In one example, service network 130 links one or more endpoint devices 131-134 with each other and with Internet 160, telecommunication service provider network 150, devices accessible via such other networks, such as endpoint devices 111-113 and 121-123, and so forth. In one example, endpoint devices 131-134 may comprise devices of organizational agents, such as database administrators or other employees or representatives who are tasked with managing DBMS(s), e.g., DB(s) 136 and/or server(s) 135, on behalf of the organization that provides service network 130. In one example, endpoint devices 131-134 may each comprise a mobile device, a cellular smart phone, a laptop, a tablet computer, a desktop computer, a bank or cluster of such devices, and the like. In one example, any one or more of endpoint devices 131-134 may comprise software programs, logic or instructions for providing a user application, comprising a user interface, that may operate in connection with examples of the present disclosure for calculating and presenting predicted latencies of transaction queries and/or for selecting and presenting configuration settings for at least one resource quota pool, as described herein. In other words, any one or more of endpoint devices 131-134 may comprise a client device operating in connection with a DBMS, e.g., provided via one or more of servers 135.

In addition, any one or more of the user devices 111-113 and/or user devices 121-123 may comprise a client device providing the same or similar functions. In this regard, server(s) 135 may maintain communications with one or more of the user devices 111-113 and/or user devices 121-123 via access networks 110 and 120, telecommunication service provider network 150, Internet 160, and so forth. Various additional functions of server(s) 135 are described above as well as in connection with the examples of FIGS. 6 and 7 and elsewhere herein.

In addition, it should be realized that the system 100 may be implemented in a different form than that illustrated in FIG. 1, or may be expanded by including additional endpoint devices, access networks, network elements, application servers, etc. without altering the scope of the present disclosure. As just one example, any one or more of server(s) 135 and DB(s) 136 may be distributed at different locations, such as in or connected to access networks 110 and 120, in another service network connected to Internet 160 (e.g., a cloud computing provider), in telecommunication service provider network 150, and so forth. Thus, these and other modifications are all contemplated within the scope of the present disclosure.

FIG. 2 illustrates an example user interface 200 in accordance with an example of the present disclosure for calculating and presenting predicted latencies of query transactions. As shown in FIG. 2, the user interface 200 may be presenting a first tab for "predictive analysis." Additional tabs "dictionary" and "model specification" may be selected and may result in the presentation of different information and/or different interaction tools. As further illustrated in FIG. 2, the user interface 200 provides for a number of control mechanisms (e.g., slider bars) associated with 10 configuration settings. These 10 configuration settings may have been selected from among a larger number of configuration settings. For instance, FIG. 3 illustrates an example dictionary presented via a user interface 300. It should be noted that user interface 200 of FIG. 2 and user interface 300 of FIG. 3 may be considered to comprise the same user interface, only presenting different screens. For instance, selection of a "predictive analysis" tab which may result in the presentation of the user interface 200 of FIG. 2, while the user interface 300 of FIG. 3 may be presented in response to a selection of a "dictionary" tab. As seen in the dictionary presented via user interface 300 of FIG. 3, there are 16 different settings, which may comprise a portion of a larger list of settings, e.g., 30 settings, 50 settings, 100 settings, etc. From the candidate settings in the dictionary, a user application may select the top 10 settings that are determined to have the greatest effect on query transaction end-to-end delay for a selected time period, and the user application may present control mechanisms for these 10 settings via the user interface 200 as shown in FIG. 2.

As illustrated in FIG. 2, some of the control mechanisms provide an absolute range from among which possible tunable setting values may be selected, while other control mechanisms may provide a relative scale/range from among which possible tunable setting values may be selected. It should also be noted that in the present example, some of the "tunable settings" may actually be beyond the control of the DBMS and/or the user application. For instance, the "transaction total number of statements" (TRNSID_NU_STMTS) is a factor of the preferences and needs of users submitting query transactions to the DBMS and is not something that can be adjusted by a DBA to improve the DBMS performance. However, by providing a control mechanism via the user interface 200, a DBA may still be able to "tune" this setting and determine a predicted response time for a query transaction that may have more or less statements than an average query transaction. On the other hand, the number of allowed concurrent statements per query transaction (TRNSID_NU_CONCURR_STMTS) may comprise a system setting and may therefore comprise a tunable setting of the DBMS. For instance, a DBA may configure the DMBS such that a maximum of 4 statements of a query transaction may execute simultaneously via one or more server nodes of the DBMS. Other elements of the user interface 200 include: a selector to allow a user to select an hour of the day (in the illustrative example of FIG. 2, the user may have selected hour "0"), a "go" button to allow a user to submit the set of tunable settings in order to obtain a predicted end-to-end response time/latency, and a display region where the user application may present the end-to-end response time prediction (e.g., 20.01 seconds in this example). It should be noted that as described above, various tunable settings may be applied to a trained MLM to generate a predicted end-to-end response time. However, the prediction may also take into account average or median values for other performance parameters (e.g., settings which may be tunable or non-tunable, load and resource consumption values, etc.), by inputting these average/median values to the trained MLM along with the tunable settings that are user-selected via the user interface 200.

To further aid in understanding the present disclosure, FIG. 4 illustrates a record table 400 comprising records for query sub-operations in connection with a single query transaction (e.g., having a transaction identifier (transaction_id) 315251974018144674). As described above, query sub-operations may be assigned to one of several resource quota pools. In this example, query sub-operations are assigned to resource quota pools "too" and "hoa." In addition, these query sub-operations may be assigned to and executed on one or more server nodes of a DBMS. For instance, a first query sub-operation is associated with a first statement of the query transaction (statement_id 1), and is assigned to resource quota pool "foo" and executes via node 0061. Similarly, a statement having statement_id 4 results in two query sub-operations, both assigned to resource quota pool "foo" and executing at node 0061. To further illustrate, a statement having statement_id 5 results in multiple query sub-operations which are assigned to resource quota pool "hoa" and which execute via a plurality of different server nodes (e.g., 0061, 0058, 0053, 0040, etc.). The start time and end time of each query sub-operation are shown in the rightmost two columns. In addition, the end-to-end response time for the query transaction may be calculated as the difference between the start time (start_timestamp) for the first query sub-operation of the first row of the record table 400 and the end time (release_timestamp) for the last query sub-operation in the last row of the record table 400.

In one example, these query sub-operation records may be used to generate KPIs associated with different resource quota pools, different query sub-operation types, different time periods (e.g., hours of the week), and/or different server nodes. The KPIs in turn may be used to generate MLM records which may be used to train a MLM to predict query sub-operation response times per server node and per time period (and in some cases, per-resource quota pool). In addition, the MLM may be used to derive optimal resource quota pool configuration settings per time period and per server node.

Figure 5:
FIG. 5 illustrates an example user interface in accordance with an example of the present disclosure for selecting and presenting configuration settings for at least one resource quota pool.

In this regard, FIG. 5 illustrates an additional example user interface 500 in accordance with an example of the present disclosure for selecting and presenting configuration settings for at least one resource quota pool. As shown in FIG. 5, the user interface 500 may be presenting a first tab for "settings optimization." Additional tabs "dictionary" and "model specification" may be selected and may result in the presentation of different information and/or different interaction tools. As further illustrated in FIG. 5, the user interface 500 provides a selector to allow a user to select an hour of the day (in the illustrative example of FIG. 5, the user may have selected hour "0"), a selector to allow a user to select a particular resource quota pool (or "resource pool," e.g., rp_elt_short in the present example), and a "go" button to allow a user to submit the selected resource quota pool and hour of the week. The user application may output via the user interface 500 a set of optimal configuration settings for at least the selected resource quota pool and hour of the week. In the present example, the user application may also output via the user interface 500 a set of median observed values for performance variables and/or KPIs associated with the execution of query sub-operations of the resource quota pool (and for the given hour of the week). For instance, the set of optimal settings may comprise a set of configuration settings that results in the lowest predicted response time for query sub-operations of the resource quota pool for the given hour of the week, where a MLM may be trained in accordance with the average, or median values for various performance parameters associated with query sub-operations executed via the resource quota pool. In the present example, the predicted response time for a query sub-operation of resource quota pool rp_elt_short executed via a server node at the given hour of the week is 2.26 seconds. In addition, FIG. 5 illustrates that the user application may output via the user interface 500 a set of optimal configuration settings for the selected resource quota pool (rp_etl_short) as well as for other resource quota pools, e.g., resource pool A, resource pool B, etc.) for the hour of the week. For instance, the lowest predicted response time for the query sub-operations executing within the selected resource quota pool for the given hour of the week may assume that the optimal settings for all of the resource quota pools are applied.

It should also be noted that the examples of FIGS. 2-5 are provided as illustrative examples. In other words, in other, further, and different examples, the user interfaces may have different forms and may comprise different input mechanisms, such as drop down menus, text/numerical input boxes, dials or wheels, and so forth. Similarly, data records such as shown in record table 400 may comprise more or less data, or different data than that which is shown. In addition, the tunable configuration settings of FIGS. 2 and 3 may have different names, may represent different types of information, and so on. Thus, these and other variations, modifications, and/or enhancements, are all contemplated within the scope of the present disclosure.

Figure 6:
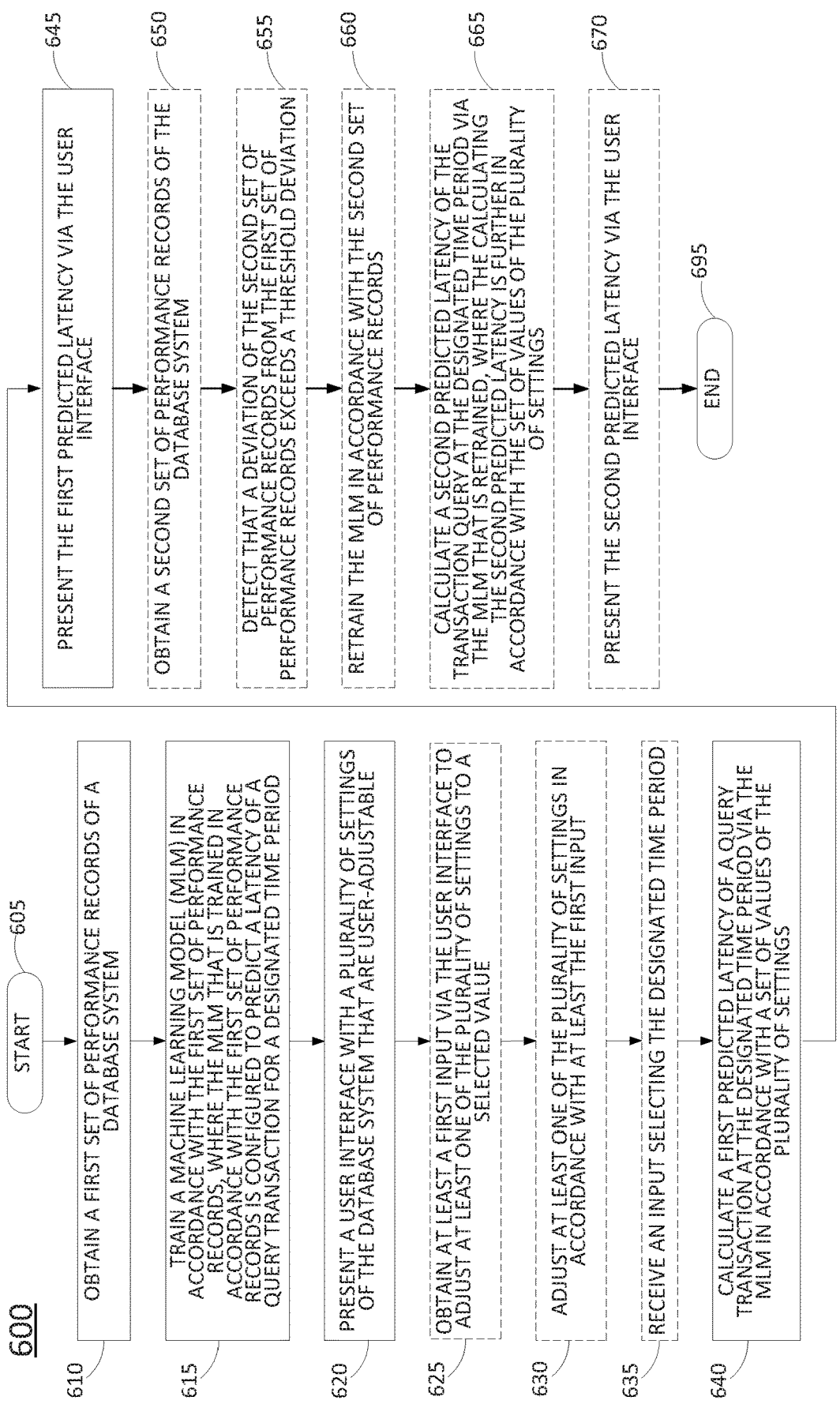
FIG. 6 illustrates an example flowchart of a method for calculating and presenting a predicted latency of a query transaction.

FIG. 6 illustrates an example flowchart of a method 600 for calculating and presenting predicted latencies of transaction queries. In one example, steps, functions, and/or operations of the method 600 may be performed by a device as illustrated in FIG. 1, e.g., one or more of servers 135. Alternatively, or in addition, the steps, functions and/or operations of the method 600 may be performed by a processing system collectively comprising a plurality of devices as illustrated in FIG. 1 such as one or more of servers 135, DB(s) 136, endpoint devices 111-113 and/or 121-123, and so forth. In one example, the steps, functions, or operations of method 600 may be performed by a computing device or system 800, and/or a processing system 802 as described in connection with FIG. 8 below. For instance, the computing device 800 may represent at least a portion of a DBMS, a server, a system, and so forth, in accordance with the present disclosure. For illustrative purposes, the method 600 is described in greater detail below in connection with an example performed by a processing system. The method 600 begins in step 605 and proceeds to step 610.

At step 610, the processing system obtains a first set of performance records of a database system, e.g., a DBMS. In one example, the first set of performance records of the database system is associated with a designated time period. For instance, the designated time period may comprise a particular hour of a week, or another recurring time block. The first set of performance records may be obtained from the components of the database system (e.g., from one or more server nodes) and/or may be obtained from a data repository which may receive and store performance metrics from the various components of the database system.

At step 615, the processing system trains a machine learning model (MLM) in accordance with the first set of performance records, where the MLM that is trained in accordance with the first set of performance records is configured to predict a latency of a query transaction for the designated time period. In one example, the MLM comprises a linear regression model. For instance, in one example, the linear regression model may comprise a least absolute shrinkage and selection operator (LASSO) model. To illustrate, the MLM may comprise a plurality of independent variables representing a designated time period and a plurality of performance metrics associated with the first set of performance records of the database system, and at least one dependent variable comprising the latency of the query transaction for the designated time period.

At step 620, the processing system presents a user interface with a plurality of settings of the database system that are user-adjustable. For instance, the user interface 200 of FIG. 2 provides an example user interface presenting a plurality of user-adjustable settings. In one example, the plurality of settings is associated with at least a portion of the plurality of independent variables of the MLM. For instance, the at least the portion of the independent variables may comprise a selected number of independent variables of the machine learning model with coefficients possessing the highest absolute values and which are user-adjustable (e.g., independent variables associate with settings that may be controlled by a DBA, in contrast to performance variables that are affected by the features of query transactions, such as the complexity of the queries, the number of queries being submitted by users/received by a DBMS in a time period, etc.).

At optional step 625, the processing system may obtain at least a first input via the user interface to adjust at least one of the plurality of settings to a selected value. For instance, the user interface 200 of FIG. 2 provides an example interface to receive input(s) to change one or more settings.

At optional step 630, the processing system may adjust at least one of the plurality of settings to the selected value in accordance with at least the first input. For example, the processing system may change at least one of the plurality of settings to the selected value and store the updated set of values of the plurality of settings prior to calculating a predicted latency at step 640.

At optional step 635, the processing system may receive an input, e.g., via the user interface, selecting the designated time period. For example, the user interface 200 of FIG. 2 provides an example interface to receive an input(s) to select a designated time period.

At step 640, the processing system calculates a first predicted latency of a query transaction at the designated time period via the MLM in accordance with a set of values of the plurality of settings. In one example, the first predicated latency of the query transaction at the designated time period may be calculated via the MLM in accordance with the set of values of the plurality of settings that includes the at least one of the plurality of settings that is adjusted to the selected value (e.g., at optional step 630). In one example, the calculation assumes that other performance parameters (e.g., settings or other performance metrics that are not user-adjustable) are average, or median values.

At step 645, the processing system presents the first predicted latency via the user interface. For instance, an example of the presentation of a predicted latency via a user interface is shown in FIG. 2.

At optional step 650, the processing system may obtain a second set of performance records of the database system. For instance, the second set of performance records may be current performance records for a given hour of the week, for example. In other words, the second set of performance records may be associated with the same designated time period as the first set of performance records (e.g., the same hour of the week), but may be associated with different iterations of the same time period (e.g., from different weeks).

At optional step 655, the processing system may detect that a deviation of the second set of performance records from the first set of performance records (e.g., a deviation of values of performance metrics of the second set of performance records from values of performance metrics of the first set of performance records) exceeds a threshold deviation. In one example, the deviation can be a Euclidean or non-Euclidean distance. In one example, optional step 650 may comprise applying a Holt-Winters thresholding to determine that the deviation is of statistical significance (e.g., enough of a deviation to trigger retraining of the MLM at optional step 660).

At optional step 660, the processing system may retrain the MLM in accordance with the second set of performance records. For instance, retraining the MLM can incorporate the second set of performance records with all or a portion of the first set of performance records as training data, e.g., some of the first set of performance records that are oldest may be dropped and the second set of performance records (plus some other performance records for the designated time period which may have been captured between the first set of performance records and the second set of performance records, etc.).

At optional step 665, the processing system may calculate a second predicted latency of the query transaction at the designated time period via the MLM that is retrained, where the calculating the second predicted latency is further in accordance with the set of values of the plurality of settings. For instance, optional step 665 may comprise the same or similar operations as described above in connection with step 640.

At optional step 670, the processing system may present the second predicted latency via the user interface. For instance, optional step 670 may comprise the same or similar operations as described above in connection with step 645. Following step 645, or any of the optional steps 650-670, the method 600 may proceed to step 695 where the method 600 ends.

It should be noted that the method 600 may be expanded to include additional steps, or may be modified to replace steps with different steps, to combine steps, to omit steps, to perform steps in a different order, and so forth. For instance, in one example the processing system may repeat one or more steps of the method 600, such as steps 610-640 and/or steps 605-670 for a different designated time period, steps 655-670 for additional deviations of performance metrics from expected or average performance metrics for the designated time period, and so on. In another example, optional steps 665 and 670 may be preceded by receiving another user input to change at least one of the plurality of configuration settings to a different value. It should also be noted that in various examples, the MLM may be trained prior to the obtaining of the input selecting the designated time period. However, in another example, the MLM may not be trained until after receiving the input selecting the designated time period. For instance, the MLM may be trained in response to receiving the input. Thus, these and other modifications are all contemplated within the scope of the present disclosure.

Figure 7:
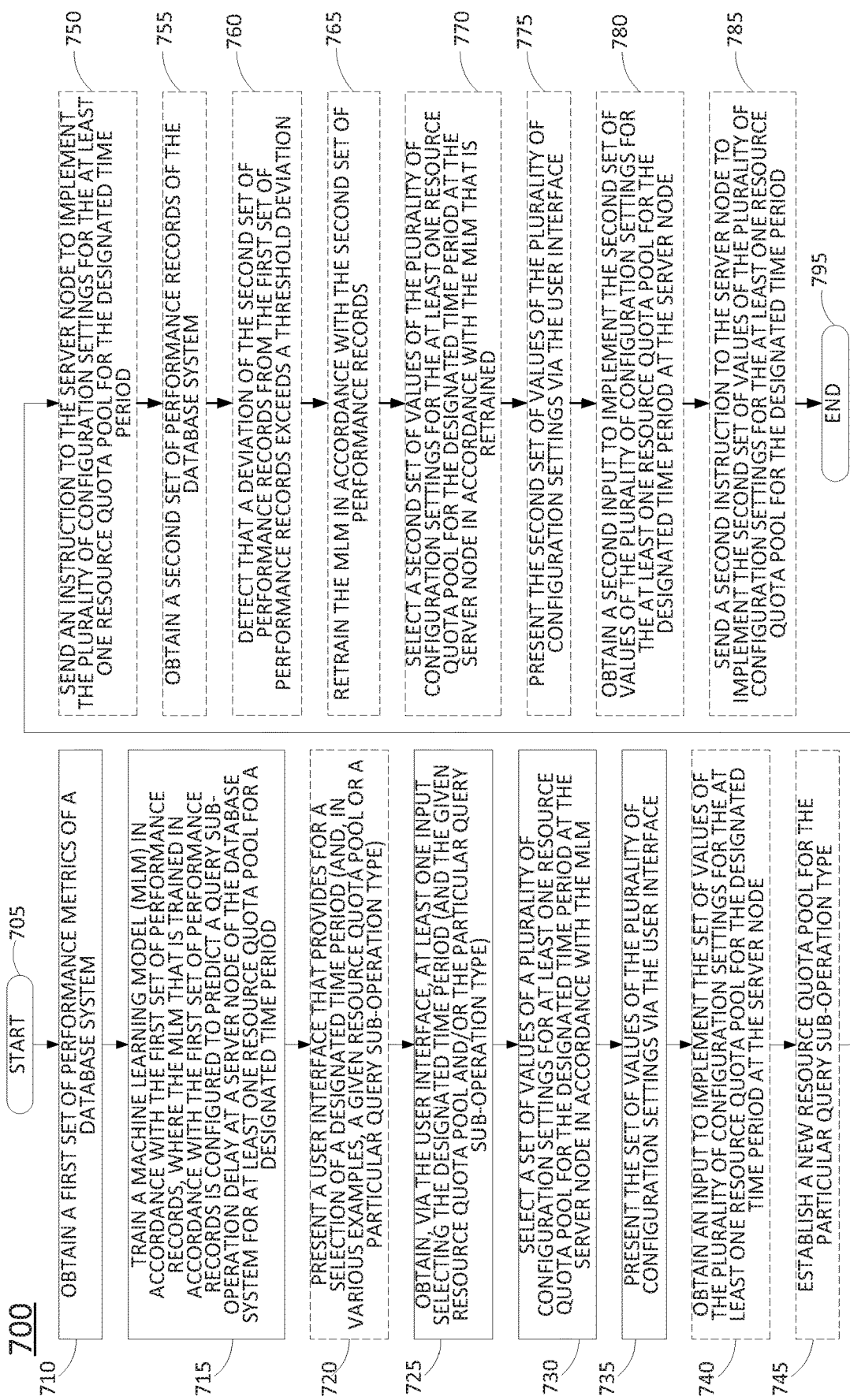
FIG. 7 illustrates an example flowchart of a method for selecting and presenting configuration settings for at least one resource quota pool.

FIG. 7 illustrates an example flowchart of a method 700 for selecting and presenting configuration settings for at least one resource quota pool. In one example, steps, functions, and/or operations of the method 700 may be performed by a device as illustrated in FIG. 1, e.g., one or more of servers 135. Alternatively, or in addition, the steps, functions and/or operations of the method 700 may be performed by a processing system collectively comprising a plurality of devices as illustrated in FIG. 1 such as one or more of servers 135, DB(s) 136, endpoint devices 111-113 and/or 121-123, and so forth. In one example, the steps, functions, or operations of method 700 may be performed by a computing device or system 800, and/or a processing system 802 as described in connection with FIG. 8 below. For instance, the computing device 800 may represent at least a portion of a DBMS, a server, a system, and so forth, in accordance with the present disclosure. For illustrative purposes, the method 700 is described in greater detail below in connection with an example performed by a processing system. The method 700 begins in step 705 and proceeds to step 710.

At step 710, the processing system obtains a first set of performance records of a database system, e.g., a DBMS. The first set of performance records may include performance records from a particular server node of the database system, but may also include performance records from other server nodes. Similarly, the first set of performance records may include performance metrics relating to a given resource quota pool, but may also include performance metrics relating to other resource quota pools. In addition, the first set of performance records may include performance records relating to a designated time period, but may also include performance records relating to other time periods. In one example, the first set of performance records may include performance records regarding query sub-operations associated with one or more resource quota pools. The first set of performance records may be obtained from the components of the database system (e.g., from one or more server nodes) and/or may be obtained from a data repository which may receive and store performance records from the various components of the database system.

In one example, each performance record relates to a query sub-operation and includes a time stamp and a plurality of performance metrics. In one example, the plurality of performance metrics includes: configuration setting values for a plurality resource quota pools, observed values associated with usage of the database system, and a delay measurement, wherein the plurality of resource quota pools includes at least one resource quota pool. In another example, the plurality of performance metrics further includes a resource quota pool identifier. In still another example, the plurality of performance metrics includes: configuration setting values for a resource quota pool in which a query sub-operation executes, observed values associated with usage of the database system, and a delay measurement.

At step 715, the processing system trains a machine learning model (MLM) in accordance with the first set of performance records, where the MLM that is trained in accordance with the first set of performance records is configured to predict a sub-operation delay at a server node of the database system for a designated time period. In one example, the MLM comprises a linear regression model. For instance, in one example, the linear regression model may comprise a LASSO model. To illustrate, the MLM may comprise a plurality of independent variables representing a plurality of performance metrics associated with the first set of performance records of the database system and at least one dependent variable comprising a sub-operation delay (or query sub-operation delay) at a server node of the database system for a designated time period.

In one example, the machine learning model that is trained in accordance with the first set of performance records is configured to predict the query sub-operation delay at the server node of the database system for a given resource quota pool for the designated time period. In another example, the machine learning model that is trained in accordance with the first set of performance records is configured to predict the query sub-operation delay at the server node of the database system for the particular query sub-operation type for the designated time period.

At optional step 720, the processing system may present a user interface that provides for a selection of a designated time period. In one example, the user interface may also provide for a selection of a given resource quota pool. For instance, the user interface 500 of FIG. 5 provides an example user interface presenting selections for a designated time period and a given resource quota pool. In such an example, the MLM that is trained in accordance with the first set of performance records may be configured to predict the query sub-operation delay at the server node of the database system for the given resource quota pool for the designated time period. In one example the MLM that is trained in accordance with the first set of performance records may be configured to predict the query sub-operation delay at the server node of the database system by setting certain predictor variables to values associated with a designated type of query sub-operation to differentiate among "small," "medium," and "large" query sub-operations. However, in other examples, the MLM can be configured to predict the query sub-operation delay at the server node for various other types of differentiations, such as classes of users submitting queries, the types of client devices submitting queries, the locations of the client devices, and so forth, by setting certain predictor variables to values associated with these differentiations.

In still another example, the user interface may also provide for a selection of a particular query sub-operation type. In such an example, the machine learning model that is trained in accordance with the first set of performance records may be configured to predict the query sub-operation delay at the server node of the database system for the particular query sub-operation type for the designated time period.

At step 725 the processing system obtains, via a user interface, at least one input selecting the designated time period. The at least one input may further select the given resource quota pool or the selected query sub-operation type. For instance, the user interface 500 of FIG. 5 provides an example interface to receive input(s) to select a time period and a resource quota pool, e.g., from a drop down menu, from a text/numeral input box, etc.

At step 730, the processing system selects a set of values of a plurality of configuration settings for at least one resource quota pool for the designated time period at the server node in accordance with the MLM. For instance, the processing system may consider candidate sets of configuration settings and may select the plurality of configuration settings that provides for the least sub-operation delay at a server node of the database system for the at least one resource quota pool for a designated time period as calculated in accordance with the MLM. For instance, the plurality of configuration settings may comprise at least a portion of the independent variables of the MLM, where the sub-operation delay may be the output/dependent variable. In one example, other independent variables of the MLM may be associated with other performance parameters (e.g., configuration settings or other performance metrics that are not user-adjustable) and average, or median values for these performance parameters may be used in connection with the calculations(s) of the sub-operation delay in accordance with the MLM.

In one example, step 730 comprises identifying a selected number of candidate performance metrics of the first set of performance metrics with the greatest effect on the sub-operation delay according to the MLM, identifying performance metrics of the candidate performance metrics that are associated with adjustable configuration settings via the database system, where the plurality of configuration settings for which the set of values is selected comprises the adjustable configuration settings that are identified, and identifying the set of values of the plurality of configuration settings that minimizes the query sub-operation delay according to the machine learning model. In one example, performance metrics of the candidate performance metrics that are not associated with adjustable configuration settings are assumed to be average or median values based upon the first set of performance metrics.

In one example, the selection of the plurality of configuration settings may be for at least the given resource quota pool. In other words, the at least one resource quota pool may comprise the given resource quota pool that may be identified in the at least one input obtained at step 725. In one example, the selection of the plurality of configuration settings may be for a plurality of resource quota pools. In another example, the selection of the plurality of configuration settings may be for the particular query sub-operation type for the designated time period at the server node (where the particular query sub-operation type may be included in the input that may be obtained at step 725).

At step 735, the processing system presents the set of values of the plurality of configuration settings via the user interface. For instance, the user interface 500 of FIG. 5 provides an example of presenting optimized configuration settings at a server node for a designated time period and for a given resource quota pool.

At optional step 740, the processing system may obtain (e.g., via the user interface) an input to implement the set of values of the plurality of configuration settings for the at least one resource quota pool for the designated time period at the server node. In one example, optional step 740 may include obtaining an indication of the server node from among a plurality of server nodes of the database system. In one example, the input may be to implement the set of values of the plurality of configuration settings for at least the given resource quota pool for the designated time period at the server node (e.g., in an example where a resource quota pool identifier is one of the performance metrics associated with an independent variable of the MLM, and where the given resource quota pool is identified in the at least one input obtained at step 725). In another example, the input may be to implement the set of values of the plurality of configuration settings for the particular query sub-operation type for the designated time period at the server node (e.g., in an example where the particular query sub-operation type is identified in the at least one input obtained at step 725).

At optional step 745, the processing system may establish a new resource quota pool for the particular query sub-operation type. It should be noted that optional step 745 may be performed in an example where the method 700 includes obtaining the particular query sub-operation type with the at least one input of step 725.

At optional step 750, the processing system may send an instruction to the server node to implement the set of values of the plurality of configuration settings for the at least one resource quota pool for the designated time period. For instance, the instruction may be sent via one or more networks using one or more protocols at various networking layers. In any case, the server node(s) of the database system may be configured to receive and implement instructions from the processing system regarding various configuration settings.

In one example, the instruction may be implement the set of values of the plurality of configuration settings for at least the given resource quota pool for the designated time period (e.g., in an example where a resource quota pool identifier is one of the performance metrics associated with an independent variable of the MLM, and where the given resource quota pool is identified in the at least one input obtained at step 725). In another example, the instruction may be to implement the set of values of the plurality of configuration settings for the new resource quota pool associated with the particular query sub-operation type for the designated time period (e.g., in an example where the particular query sub-operation type is identified in the at least one input obtained at step 725). In addition, in an example where the method 700 includes optional step 745, the instruction may further be for the server node to activate the new resource quota pool and to implement the set of values of the plurality of configuration settings for the particular query sub-operation type for the designated time period via the new resource quota pool.

At optional step 755, the processing system may obtain a second set of performance records of the database system. For instance, optional step 755 may comprise the same or similar operations as described above in connection with step 710. In addition, optional step 755 may comprise the same or similar operations as described above in connection with optional step 650 of the example method 600 of FIG. 6.

At optional step 760 the processing system may detect that a deviation of the second set of performance records from the first set of performance records exceeds a threshold deviation. For instance, optional step 760 may comprise the same or similar operations as described above in connection with optional step 655 of the example method 600 of FIG. 6.

At optional step 765 the processing system may retrain the MLM in accordance with the second set of performance records. For instance, retraining the MLM can incorporate the second set of performance records with all or a portion of the first set of performance records as training data, e.g., some of the first set of performance records that are oldest may be dropped and the second set of performance records (plus some other performance records for the designated time period which may have been captured between the first set of performance records and the second set of performance records, etc.). In one example, optional step 765 may comprise the same or similar operations as described above in connection with optional step 660 of the example method 600 of FIG. 6 (however, it should be noted that the respective MLMs may have different sets of independent variables and have different dependent (predicted) variables).

At optional step 770, the processing system may select a second set of values of plurality of configuration settings for the at least one resource quota pool for the designated time period at the server node in accordance with the MLM that is retrained. For instance, optional step 770 may comprise the same or similar operations as described above in connection with step 730.

At optional step 775, the processing system may present the second set of values of the plurality of configuration settings via the user interface. For instance, optional step 775 may comprise the same or similar operations as described above in connection with step 735.

At optional step 780, the processing system may obtain (e.g., via the user interface) a second input to implement the second set of values of the plurality of configuration settings for the at least one resource quota pool for the designated time period at the server node. In one example, optional step 780 may include obtaining an indication of the server node from among a plurality of server nodes of the database system. In one example, optional step 780 may comprise the same or similar operations as described above in connection with optional step 740.

At optional step 785, the processing system may send a second instruction to the server node to implement the second set of values of the plurality of configuration settings for the at least one resource quota pool for the designated time period. For example, optional step 785 may comprise the same or similar operations as described above in connection with optional step 750. Following step 735, or any of the optional steps 740-785, the method 700 may proceed to step 795 where the method 700 ends.

It should be noted that the method 700 may be expanded to include additional steps, or may be modified to replace steps with different steps, to combine steps, to omit steps, to perform steps in a different order, and so forth. For instance, in one example the processing system may repeat one or more steps of the method 700, such as steps 710-735 and/or steps 710-785 for a different designated time period and/or for a different resource quota pool and/or for a different query sub-operation type. In one example, step 780 may comprise obtaining an input that may designate a different server node. In other words, the set of values of the plurality of configuration settings may be implemented at a first server node of the database system in accordance with optional step 750, while the second set of values of the plurality of configuration settings may be implemented via a second server node of the database system in accordance with optional step 785. It should also be noted that in various examples, the MLM may be trained prior to the obtaining of the input(s) selecting the designated time period. However, in another example, the MLM may not be trained until after receiving the input(s) selecting the designated time period. For instance, the MLM may be trained in response to receiving the input(s).

In still another example, optional step 720, step 725, and optional steps 740, 770, and 775 may be omitted. For instance, there may be no user input to select the designated time period or to implement the first and/or second plurality of configuration settings. In other words, the processing system may be programmed to automatically configure one or more server nodes in accordance with the plurality of configuration settings that is determined to minimize the sub-operation delay according to the MLM (e.g., without any additional and/or any specific input from a DBA or other user prior to instructing the server node(s)). Thus, these and other modifications are all contemplated within the scope of the present disclosure.

In addition, although not expressly specified above, one or more steps of the method 600 or the method 700 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 6 or FIG. 7 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

Figure 8:
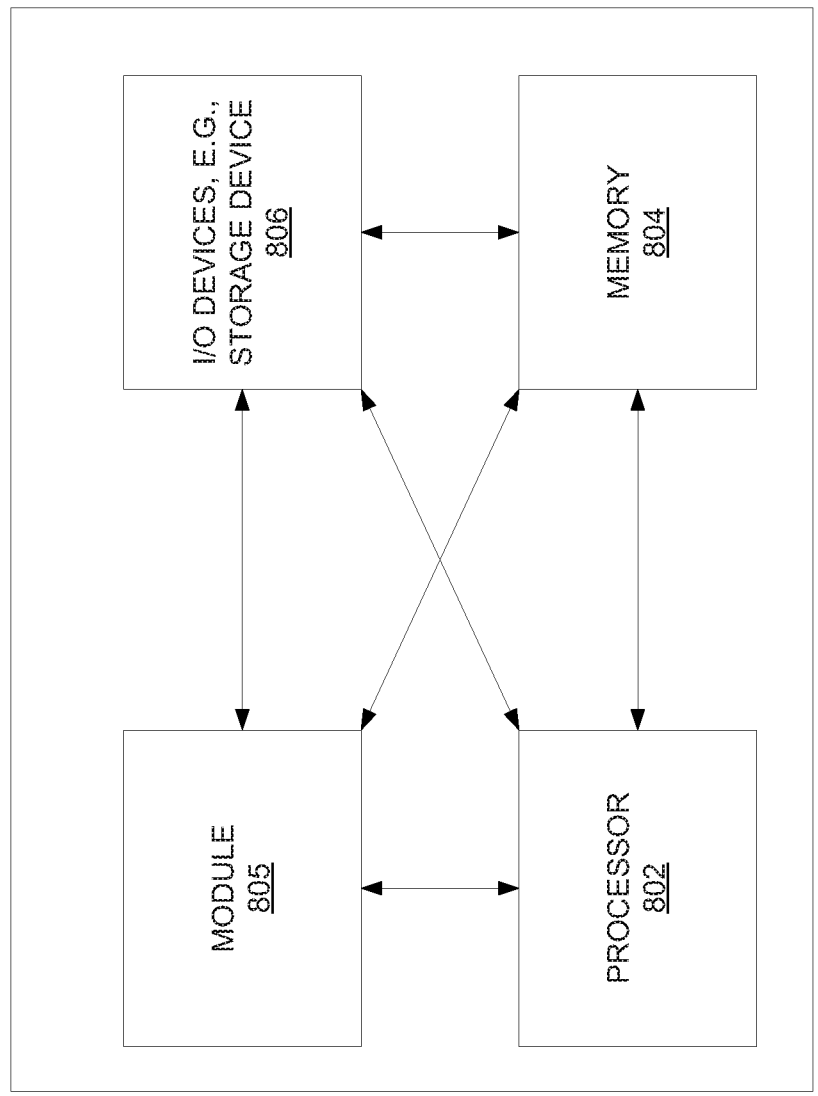
FIG. 8 illustrates a high-level block diagram of a computing device or system specifically programmed to perform the functions described herein.

FIG. 8 depicts a high-level block diagram of a computing device or processing system specifically programmed to perform the functions described herein. For example, any one or more components or devices illustrated in FIG. 1, or described in connection with the method 600 of FIG. 6 or the method 700 of FIG. 7 may be implemented as the processing system 800. As depicted in FIG. 8, the processing system 800 comprises one or more hardware processor elements 802 (e.g., a microprocessor, a central processing unit (CPU) and the like), a memory 804, (e.g., random access memory (RAM), read only memory (ROM), a disk drive, an optical drive, a magnetic drive, and/or a Universal Serial Bus (USB) drive), a module 805 for calculating and presenting predicted latencies of transaction queries or for selecting and presenting configuration settings for at least one resource quota pool, and various input/output devices 806, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 802 can also be configured or programmed to cause other devices to perform one or more operations as discussed above. In other words, the hardware processor 802 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 805 for calculating and presenting predicted latencies of transaction queries or for selecting and presenting configuration settings for at least one resource quota pool (e.g., a software program comprising computer-executable instructions) can be loaded into memory 804 and executed by hardware processor element 802 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 805 for calculating and presenting predicted latencies of transaction queries or for selecting and presenting configuration settings for at least one resource quota pool (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
    obtaining, by a processing system including at least one processor, a first set of performance records of a database system;
    training, by the processing system, a machine learning model in accordance with the first set of performance records, where the machine learning model that is trained in accordance with the first set of performance records comprises a plurality of independent variables representing a plurality of performance metrics associated with the first set of performance records of the database system and at least one dependent variable comprising a query sub-operation delay at a server node of the database system for a designated time period, wherein the plurality of performance metrics includes a plurality of configuration settings for at least one resource quota pool of the database system, wherein the plurality of configuration settings comprises a plurality of user-adjustable configuration settings, wherein the designated time period comprises a predefined time block within a time unit comprising one of: a day, a week, a month, or a year, wherein the predefined time block is a recurrent time block within the time unit, and wherein the predefined time block comprises less than an entirety of the time unit;
    obtaining, by the processing system via a user interface, at least one input selecting the designated time period, wherein the at least one input is further selecting a particular query sub-operation type;
    selecting, by the processing system, a set of values of the plurality of configuration settings for the at least one resource quota pool of the database system for the designated time period at the server node in accordance with the machine learning model, wherein the selecting comprises applying candidate sets of values of the plurality of configuration settings to the machine learning model and selecting the set of values of the plurality of configuration settings that provides a least query sub-operation delay at the server node of the database system for the at least one resource quota pool for the designated time period;
    presenting, by the processing system, the set of values of the plurality of configuration settings via the user interface;
    obtaining, by the processing system, an input to implement the set of values of the plurality of configuration settings for the particular query sub-operation type for the designated time period at the server node; and
    sending, by the processing system, an instruction to the server node to implement the set of values of the plurality of configuration settings for the particular query sub-operation type for the designated time period.

2. The method of claim 1, wherein the training the machine learning model in accordance with the first set of performance records utilizes time stamps and the plurality of performance metrics associated with the first set of performance records as inputs, wherein for each performance record of the first set of performance records, the plurality of performance metrics includes: configuration setting values for a plurality resource quota pools, observed values associated with usage of the database system, and a delay measurement, wherein the plurality of resource quota pools includes the at least one resource quota pool.

3. The method of claim 1, wherein the selecting comprises:
    identifying a selected number of candidate performance metrics of the plurality of performance metrics with a greatest effect on the query sub-operation delay according to the machine learning model;
    identifying performance metrics of the candidate performance metrics that are associated with adjustable configuration settings of the database system, wherein the plurality of configuration settings for which the set of values is selected comprises the adjustable configuration settings, wherein the adjustable configuration settings comprise the plurality of user-adjustable configuration settings; and
    identifying the set of values of the plurality of configuration settings that minimizes the query sub-operation delay according to the machine learning model.

4. The method of claim 3, wherein for the identifying the set of values of the plurality of configuration settings of the adjustable configuration settings that minimizes the query sub-operation delay, performance metrics of the candidate performance metrics that are not associated with the adjustable configuration settings are assumed to be average values based upon the first set of performance records.

5. The method of claim 1, further comprising:
    obtaining a second set of performance records of the database system;
    detecting that a deviation of the second set of performance records from the first set of performance records exceeds a threshold deviation; and retraining the machine learning model in accordance with the second set of performance records.

6. The method of claim 1, wherein the at least one input is further selecting a given resource quota pool of the at least one resource quota pool, wherein the machine learning model that is trained in accordance with the first set of performance records is configured to predict the query sub-operation delay at the server node of the database system for the given resource quota pool for the designated time period.

7. The method of claim 6, wherein the training the machine learning model in accordance with the first set of performance records utilizes time stamps and the plurality of performance metrics associated with the first set of performance records as inputs, wherein for each performance record of the first set of performance records, the plurality of performance metrics includes: a resource quota pool identifier, configuration setting values for a plurality resource quota pools, observed values associated with usage of the database system, and a delay measurement, wherein the plurality of resource quota pools includes the at least one resource quota pool.

8. The method of claim 6, wherein the selecting comprises selecting the set of values of the plurality of configuration settings for at least the given resource quota pool for the designated time period at the server node in accordance with the machine learning model.

9. The method of claim 6, wherein the given resource quota pool is associated with the particular query sub-operation type.

10. The method of claim 1, wherein the machine learning model that is trained in accordance with the first set of performance records is configured to predict the query sub-operation delay at the server node of the database system for the particular query sub-operation type for the designated time period.

11. The method of claim 10, wherein the training the machine learning model in accordance with the first set of performance records utilizes time stamps and the plurality of performance metrics associated with the first set of performance records as inputs, wherein for each performance record of the first set of performance records, the plurality of performance metrics includes: configuration setting values for a resource quota pool in which a query sub-operation executes, observed values associated with usage of the database system, and a delay measurement.

12. The method of claim 10, wherein the selecting comprises selecting the set of values of the plurality of configuration settings for the particular query sub-operation type for the designated time period at the server node in accordance with the machine learning model.

13. The method of claim 1, further comprising:
establishing a new resource quota pool for the particular query sub-operation type, wherein the instruction to the server node comprises an instruction to the server node to activate the new resource quota pool and to implement the set of values of the plurality of configuration settings for the particular query sub-operation type for the designated time period via the new resource quota pool.

14. An apparatus, comprising:
a processing system including at least one processor; and
a non-transitory computer-readable medium storing which, when executed by the processing system, cause the processing system to perform operations, the operations comprising:
obtaining a first set of performance records of a database system;
training a machine learning model in accordance with the first set of performance records, where the machine learning model that is trained in accordance with the first set of performance records comprises a plurality of independent variables representing a plurality of performance metrics associated with the first set of performance records of the database system and at least one dependent variable comprising a query sub-operation delay at a server node of the database system for a designated time period, wherein the plurality of performance metrics includes a plurality of configuration settings for at least one resource quota pool of the database system, wherein the plurality of configuration settings comprises a plurality of user-adjustable configuration settings, wherein the designated time period comprises a predefined time block within a time unit comprising one of: a day, a week, a month, or a year, wherein the predefined time block is a recurrent time block within the time unit, and wherein the predefined time block comprises less than an entirety of the time unit;
obtaining, via a user interface, at least one input selecting the designated time period, wherein the at least one input is further selecting a particular query sub-operation type;
selecting a set of values of the plurality of configuration settings for the at least one resource quota pool of the database system for the designated time period at the server node in accordance with the machine learning model, wherein the selecting comprises applying candidate sets of values of the plurality of configuration settings to the machine learning model and selecting the set of values of the plurality of configuration settings that provides a least query sub-operation delay at the server node of the database system for the at least one resource quota pool for the designated time period;
presenting the set of values of the plurality of configuration settings via the user interface;
obtaining an input to implement the set of values of the plurality of configuration settings for the particular query sub-operation type for the designated time period at the server node; and
sending an instruction to the server node to implement the set of values of the plurality of configuration settings for the particular query sub-operation type for the designated time period.

15. The apparatus of claim 14, wherein the training the machine learning model in accordance with the first set of performance records utilizes time stamps and the plurality of performance metrics associated with the first set of performance records as inputs, wherein for each performance record of the first set of performance records, the plurality of performance metrics includes: configuration setting values for a plurality resource quota pools, observed values associated with usage of the database system, and a delay measurement, wherein the plurality of resource quota pools includes the at least one resource quota pool.

16. The apparatus of claim 14, wherein the selecting comprises:
identifying a selected number of candidate performance metrics of the plurality of performance metrics with a greatest effect on the query sub-operation delay according to the machine learning model;
identifying performance metrics of the candidate performance metrics that are associated with adjustable configuration settings of the database system, wherein the plurality of configuration settings for which the set of values is selected comprises the adjustable configuration settings, wherein the adjustable configuration settings comprise the plurality of user-adjustable configuration settings; and identifying the set of values of the plurality of configuration settings that minimizes the query sub-operation delay according to the machine learning model.

17. The apparatus of claim 16, wherein for the identifying the set of values of the plurality of configuration settings of the adjustable configuration settings that minimizes the query sub-operation delay, performance metrics of the candidate performance metrics that are not associated with the adjustable configuration settings are assumed to be average values based upon the first set of performance records.

18. The apparatus of claim 14, wherein the operations further comprise:
  obtaining a second set of performance records of the database system;
  detecting that a deviation of the second set of performance records from the first set of performance records exceeds a threshold deviation; and
  retraining the machine learning model in accordance with the second set of performance records.

19. The apparatus of claim 14, wherein the at least one input is further selecting a given resource quota pool of the at least one resource quota pool, wherein the machine learning model that is trained in accordance with the first set of performance records is configured to predict the query sub-operation delay at the server node of the database system for the given resource quota pool for the designated time period.

20. A non-transitory computer-readable medium storing which, when executed by a processing system including at least one processor, cause the processing system to perform operations, the operations comprising:
  obtaining a first set of performance records of a database system;
  training a machine learning model in accordance with the first set of performance records, where the machine learning model that is trained in accordance with the first set of performance records comprises a plurality of independent variables representing a plurality of performance metrics associated with the first set of performance records of the database system and at least one dependent variable comprising a query sub-operation delay at a server node of the database system for a designated time period, wherein the plurality of performance metrics includes a plurality of configuration settings for at least one resource quota pool of the database system, wherein the plurality of configuration settings comprises a plurality of user-adjustable configuration settings, wherein the designated time period comprises a predefined time block within a time unit comprising one of: a day, a week, a month, or a year, wherein the predefined time block is a recurrent time block within the time unit, and wherein the predefined time block comprises less than an entirety of the time unit;
  obtaining, via a user interface, at least one input selecting the designated time period, wherein the at least one input is further selecting a particular query sub-operation type;
  selecting a set of values of the plurality of configuration settings for the at least one resource quota pool of the database system for the designated time period at the server node in accordance with the machine learning model, wherein the selecting comprises applying candidate sets of values of the plurality of configuration settings to the machine learning model and selecting the set of values of the plurality of configuration settings that provides a least query sub-operation delay at the server node of the database system for the at least one resource quota pool for the designated time period;
  presenting the set of values of the plurality of configuration settings via the user interface;
  obtaining an input to implement the set of values of the plurality of configuration settings for the particular query sub-operation type for the designated time period at the server node; and
  sending an instruction to the server node to implement the set of values of the plurality of configuration settings for the particular query sub-operation type for the designated time period.

* * * * *